(12) United States Patent
Sato (10) Patent No.: US 7,454,231 B2
(45) Date of Patent: Nov. 18, 2008

(54) PORTABLE CELLULAR PHONE

(75) Inventor: Ryohei Sato, Saitama (JP)

(73) Assignee: NEC Corporation, Tokyo (JP)

( * ) Notice: Subject to any disclaimer, the term of this patent is extended or adjusted under 35 U.S.C. 154(b) by 1168 days.

(21) Appl. No.: 10/406,501

(22) Filed: Apr. 4, 2003

(65) Prior Publication Data

US 2004/0204092 A1    Oct. 14, 2004

(30) Foreign Application Priority Data

Apr. 15, 2002    (JP) .............................. 2002-112606

(51) Int. Cl.
 H04M 1/00    (2006.01)
 H04B 1/38    (2006.01)
 H04B 1/16    (2006.01)
 H04L 12/58    (2006.01)
(52) U.S. Cl. ................. 455/558; 455/343.6; 455/412.1; 455/573; 455/574
(58) Field of Classification Search .............. 455/412.1, 455/573, 558, 343.6, 574
See application file for complete search history.

(56) References Cited

U.S. PATENT DOCUMENTS

| | | | | |
|---|---|---|---|---|
| 5,987,325 | A | * | 11/1999 | Tayloe .................... 455/435.2 |
| 5,996,028 | A | | 11/1999 | Niimi et al. |
| 6,148,192 | A | * | 11/2000 | Ahvenainen ................ 455/410 |
| 6,263,214 | B1 | * | 7/2001 | Yazaki et al. ............... 455/558 |
| 6,463,300 | B1 | * | 10/2002 | Oshima ..................... 455/558 |
| 6,763,249 | B2 | * | 7/2004 | Shirai ....................... 455/558 |
| 7,151,922 | B2 | * | 12/2006 | Sashihara et al. ......... 455/412.2 |
| 7,269,445 | B2 | * | 9/2007 | Natsuno et al. ............. 455/558 |

(Continued)

FOREIGN PATENT DOCUMENTS

CN    1310541 A    8/2001

OTHER PUBLICATIONS

Chinese Office Action dated Apr. 2, 2004.

(Continued)

*Primary Examiner*—Fan Tsang
*Assistant Examiner*—Lisa Hashem
(74) *Attorney, Agent, or Firm*—Whitham Curtis Christofferson & Cook, PC (57) ABSTRACT

A portable cellular phone is provided which is capable of minimizing a number of times of processes of reading user data from a user identity module (UIM) card and expansion of user data in an embedded memory when power is ON. The portable cellular phone is so configured that the UIM card can be mounted in its UIM card socket and, once the UIM card has been installed, a UIM card detached/attached history detecting unit detects whether or not the UIM card has been detached and then the UIM card or another UIM card has been attached and stores a result from the detecting in a register section embedded therein. Even when power is OFF state, the UIM card detached/attached history detecting unit can detect whether or not the UIM card has been detached and then attached again. After power is ON, a central processing unit (CPU) reads a register value stored in the UIM card detached/attached history detecting unit through a peripheral circuit. The CPU, only when having judged, based on the register value, that the UIM card has been detached, reads information containing user data such as a telephone number directory or a like from the UIM card and expands it in a random access memory (RAM).

14 Claims, 6 Drawing Sheets

U.S. PATENT DOCUMENTS

2001/0016502 A1 8/2001 Shirai
2005/0224587 A1* 10/2005 Shin et al. .................... 235/492
2007/0218946 A1* 9/2007 Kim ........................... 455/558

OTHER PUBLICATIONS

English translation of the Chinese Office Action dated Apr. 2, 2004.
British Office Action dated Sep. 30, 2003.

* cited by examiner

PORTABLE CELLULAR PHONE

BACKGROUND OF THE INVENTION

1. Field of the Invention

The present invention relates to a portable cellular phone and more particularly to the portable cellular phone being capable of mounting a UIM (User Identity Module) card and being capable of reducing a number of times user data is read or written from or to the UIM card.

The present application claims priority of Japanese Patent Application No. 2002-112606 filed on Apr. 15, 2002, which is hereby incorporated by reference.

2. Description of the Related Art

In a third generation portable cellular phone employing a W-CDMA (Wideband-Coded Division Multiple Access) method, a user ID (IDentification number) is incorporated in an IC (Integrated Circuit) card having a size of a postage stamp, as called a "UIM card". The UIM card, by mounting, in addition to a processor to perform an authentication process or a like, a flash memory serving as a storage unit, can store user data. Moreover, the UIM, card, since it can be detached from the third generation portable cellular phone proper, can be interchanged and used between the third generation portable cellular phone proper and another third generation portable cellular phone proper. Therefore, it is made possible for the same user to use a plurality of third generation portable cellular phones using the same UIM card and the same third generation portable cellular phone can be used around among a plurality of users by replacing different UIM cards. For example, in a pre-third generation portable cellular phone portable cellular phone being an earlier model, data such as an address book that has to be prepared every time a user buys a new portable cellular phone, is written in an embedded memory and, as a result, unless a personal computer installing "telephone number directory" software for a portable cellular phone is used, it is difficult for the user to transfer such data by himself from the pre-third generation portable cellular phone portable cellular phone to another pre-third generation portable cellular phone portable cellular phone, that is, to port data between pre-third generation portable cellular phone portable cellular phones. However, the third generation portable cellular phone has an advantage in that it can store such as an address book in the UIM card and therefore a further inputting operation is not required when the user buys a new third generation portable cellular phone.

In the third generation portable cellular phone that can use the UIM card, after the UIM card is inserted into the third generation portable cellular phone proper, for example, by being replaced with another UIM card, user data being stored in the UIM card, when the third generation portable cellular phone is turned ON, is expanded (that is, stored) in an internal RAM (Random Access Memory) come with in the portable cellular phone. Then, when the user refers to a telephone number directory (record) or a like, user data being expanded in the internal RAM is read.

Generally, since space for mounting the UIM card is located in a battery pack area, to detach and attach the UIM card, a battery pack has to be first removed. Therefor, a judgement as to whether the UIM card has been replaced or not is made by detecting whether the battery pack has been removed or not.

However, in the conventional third generation portable cellular phone, a judgment as to whether or not the UIM card has been detached is made by detecting whether the battery pack has been removed or not and, therefore, if the battery pack has been removed once, irrespective of whether the UIM card has been actually removed or not, user data is read from the UIM card all the time and the data is expanded in the internal RAM when the portable cellular phone is turned ON another time. Since reading user data from the UIM card requires time of about several tens seconds in many cases, though the required time varies depending on a data storing capacity, the user feels that the portable cellular phone expends much waiting time. However, expansion of user data into the internal RAM from the UIM card occurring every time the third generation portable cellular phone is turned ON so long as the UIM card has not been replaced is not necessary and, if it can be judged and confirmed that no UIM card has been detached when the third generation portable cellular phone is turned ON, neither the reading nor the expanding are necessary. It is desirable that a number of times data is read from the UIM card is as small as possible.

SUMMARY OF THE INVENTION

In view of the above, it is an object of the present invention to provide a third generation portable cellular phone being capable of minimizing a number of times user data is read from a UIM card and user data is expanded into an embedded memory when the third generation portable cellular phone is turned ON.

According to a first aspect of the present invention, there is provided a third generation portable cellular phone on which a UIM card is able to be mounted, including:

a detecting unit to electrically detect whether or not the UIM card has been detached and then the UIM card or another UIM card has been attached again, and to store a result obtained from the detecting as history data; and a controlling unit to read contents being stored in the detecting unit after power is turned ON and, only when the history data showing that the UIM card has been detached and then the UIM card or another UIM card has been attached again is confirmed, to read information containing user data from the UIM card.

In the foregoing aspect, a preferable mode is one wherein the user data includes a telephone number directory.

Another preferable mode is one wherein the detecting unit is connected to a backup power source and is provided with a switch whose output state changes when the UIM card is attached and detached and with a register unit to store an output state of the switch.

Still another preferable mode is one wherein the switch is so located as to operate in synchronization with operations of detaching and attaching the UIM card in or out of a UIM card socket from which the UIM card is detachable and attachable.

An additional preferable mode is one wherein the controlling unit, when having judged that there is no record in the history data showing that the UIM card has been detached and then the UIM card or another UIM card has been attached again, reads information not containing the user data.

A further preferable mode is one wherein the controlling unit has a central processing unit (CPU) which reads a value stored in the register unit to judge whether or not the UIM card has been detached and then the UIM or another UIM card has been attached again and, when judged that there is no record in the history data showing that the UIM card has been detached and then the UIM card or another UIM card has been attached again, reads information not containing the user data.

A still further preferable mode is one wherein the controlling unit has a central processing unit (CPU) which reads a value stored in the register unit to judge whether or not the UIM card has been detached and then the UIM card or another UIM card has been attached again and, when having judged that the UIM card has been detached and then the UIM card or another UIM card has been attached again, reads information containing the user data.

With the above configurations, irrespective of whether a portable cellular phone is turned ON or OFF, when the UIM card has been detached and then the UIM card or another UIM card has been attached again, data on the detaching and the attaching is stored as the history data in the detecting unit. By reading contents of the history data being stored in the detecting unit when power is again turned ON, whether the UIM card has been replaced or re-inserted can be judged. If the history data showing that the UIM card has been replaced or re-inserted is confirmed, since it can be thought that a change has occurred in contents of the UIM card, information containing the user data such as the telephone number directory from the UIM card is read. On the other hand, if no history data showing that the UIM card has been replaced or re-inserted is confirmed, since it can be judged that the UIM card has not been replaced with another UIM card or that the UIM card has not been re-inserted, only information not containing user data is read. Therefore, it is possible to minimize a number of times of reading user data such as the telephone number directory which requires a long time to read. That is, even if power of the portable cellular phone of the present invention is OFF, whether or not the UIM card has been detached is electrically detected by the detecting unit and the history data on whether or not the UIM card has been detached and then the UIM card or another UIM card has been attached again is stored and, when power is turned ON next time, contents being stored in the detecting unit are read by the controlling unit and, only when the history data showing that the UIM card has been detached and then attached is confirmed, information containing the user data such as a telephone number directory or a like is read from the UIM card. Therefore, processing of reading user data such as the telephone number directory or the like from the UIM card is performed only when the UIM card is replaced or re-inserted and processing of reading the user data is not performed in any other case even if power is ON. As a result, it is possible to reduce a number of times of processes of reading the user data which requires a long time, and to reduce a user waiting time, hereby being capable of achieving better usability of the portable cellular phone.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Embodiment

Figure 1:
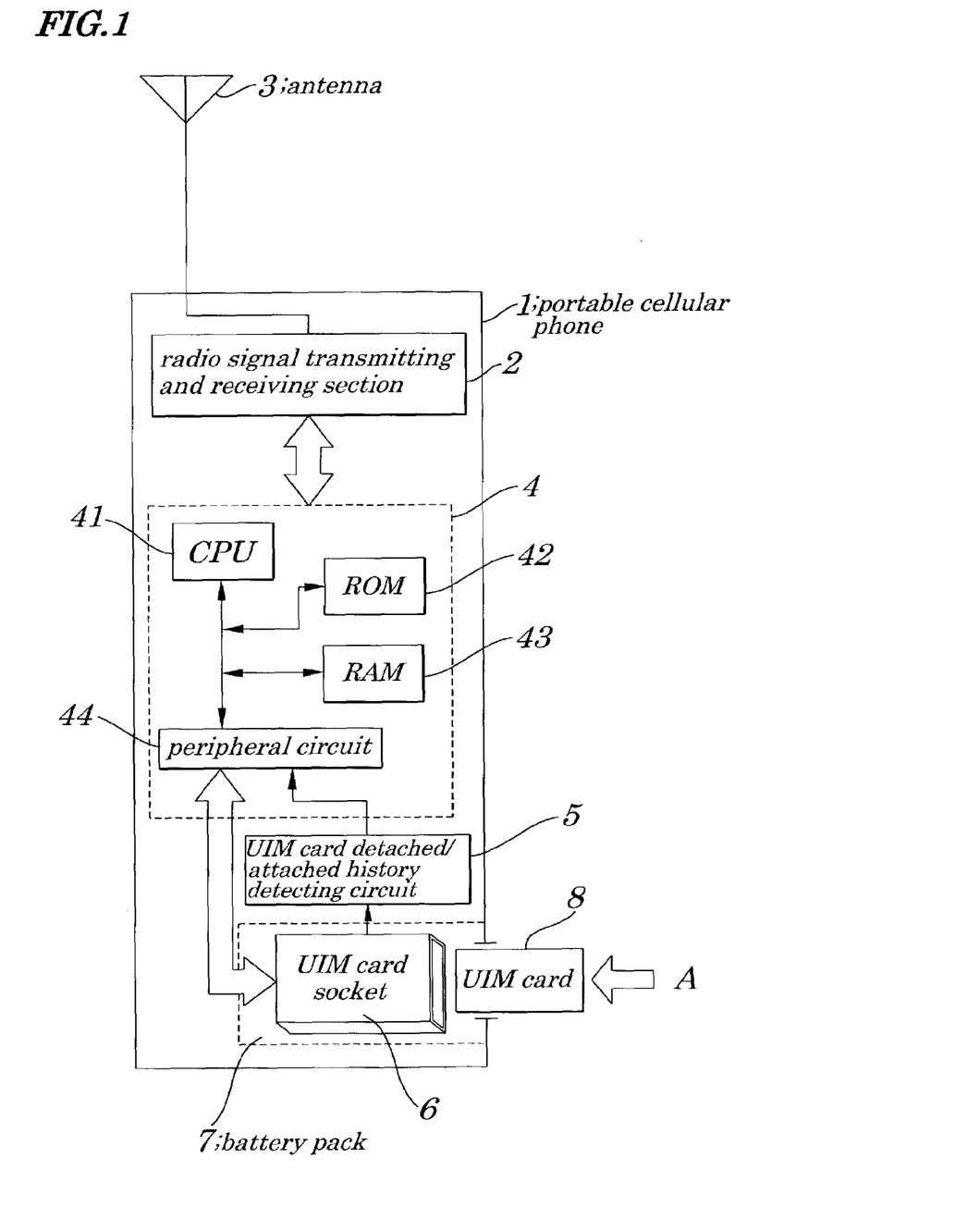
FIG. 1 is a diagram showing configurations of a third generation portable cellular phone according to an embodiment of the present invention.

FIG. 1 is a diagram showing configurations of a third generation portable cellular phone according to an embodiment of the invention. The third generation portable cellular phone (hereinafter, simply referred to as portable cellular phone) 1 includes a radio signal transmitting and receiving section 2 to modulate and demodulate radio data and to transmit and receive the radio data, an antenna 3, a control section 4 to control the entire portable cellular phone 1 and to connect the portable cellular phone 1 to a UIM card 8 or a like, a UIM card detached/attached history detecting circuit 5 to detect whether or not the UIM card 8 has been detached and then the UIM card 8 or another UIM card 8 has been attached again, a UIM card socket 6 on which the UIM card 8 is mounted, and a battery (not shown) pack 7 (constructed by integrating a secondary battery into a dedicated resin case (not shown) so as to match with the portable cellular phone 1).

The control section 4 has a CPU (Central Processing Unit) 41, a ROM (Read Only Memory) 42 in which a program is stored, a RAM 43 to store detached and attached history data of the UIM card 8 and various data, and a peripheral circuit 44 to interface between the CPU 41 and the UIM card 8, and between the CPU 41 and the UIM card detached/attached history detecting circuit 5. The RAM 43, since it is partially backed up using a backup battery (not shown), can store data for a specified period of time even when the battery pack 7 has been removed. Data is transmitted and received between the CPU 41 and the UIM card 8 through the peripheral circuit 44 and a terminal portion (not shown) of the UIM card socket 6.

Figure 2:
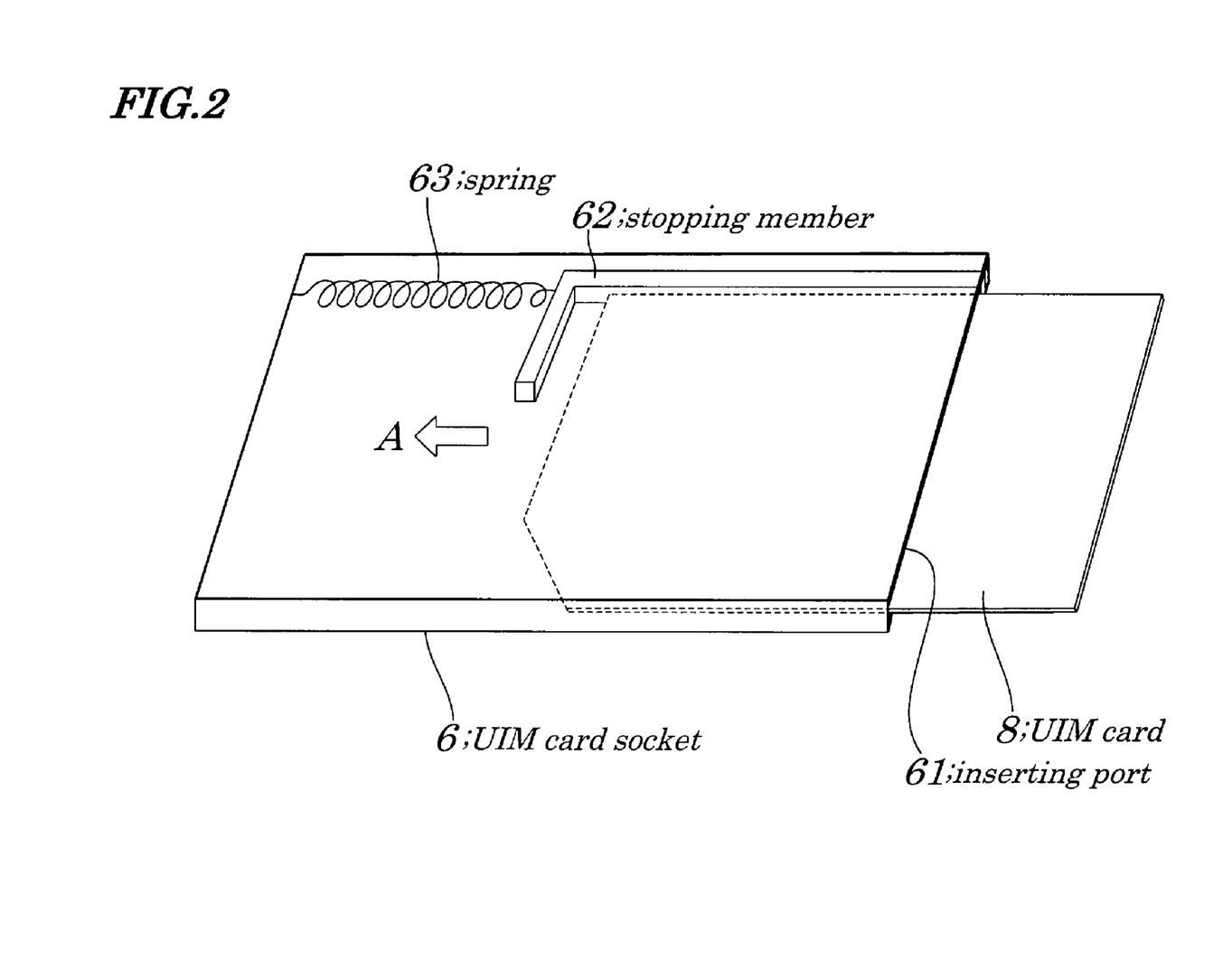
FIG. 2 is a perspective view illustrating detailed configurations of a UIM card and a UIM card socket of the third generation portable cellular phone of FIG. 1.

FIG. 2 is a perspective view illustrating detailed configurations of the UIM card socket 6 and UIM card 8 of FIG. 1. The UIM card socket 6 is of a push lock/unlock type and, in one portion of the UIM card socket 6, is formed an inserting port 61 used to insert the UIM card 8. Inside the UIM card socket 6 is placed an L-shaped stopping member 62 in a manner that it can be slid and is locked in a specified location. Each of the L-shaped stopping member 62 and the UIM card socket 6 has a terminal portion (not shown) to electrically connect both of them at a place where the L-shaped stopping member 62 and the UIM card socket 6 face each other. When the UIM card 8 is fully inserted into the UIM card socket 6, the terminal portion of the UIM card 8 is fitted in the terminal portion of the stopping member 62 to establish electrical connection between them, which enables reading and writing of data.

One end portion of a spring 63 is connected to a corner section of the L-shaped stopping member 62 and another end portion of the spring 63 is connected to an inner portion within the UIM card socket 6. When the UIM card 8 is inserted into the UIM card socket 6 through the inserting port 61, a front end portion of the UIM card 8 contacts the L-shaped stopping member 62 and if the UIM card 8 is further inserted into the UIM card socket 6, the L-shaped stopping member 62 together with the UIM card 8 moves in an arrow direction A. The UIM card 8, while being moved, is locked in the specified location. At the same time, the terminal portion of the UIM card 8 contacts the terminal portion of the L-shaped stopping member 62 to establish electrical connection. When the UIM card 8 is to be removed, the UIM card 8 being in a locked state is unlocked by being pushed again and then pushed out by momentum increasing force of the spring 63 toward a direction of the inserting port 61. At this point, the terminal portion of the UIM card 8 is separated from the terminal portion of the L-shaped stopping member 62 and is put into an electrical non-connection state.

Figure 3:
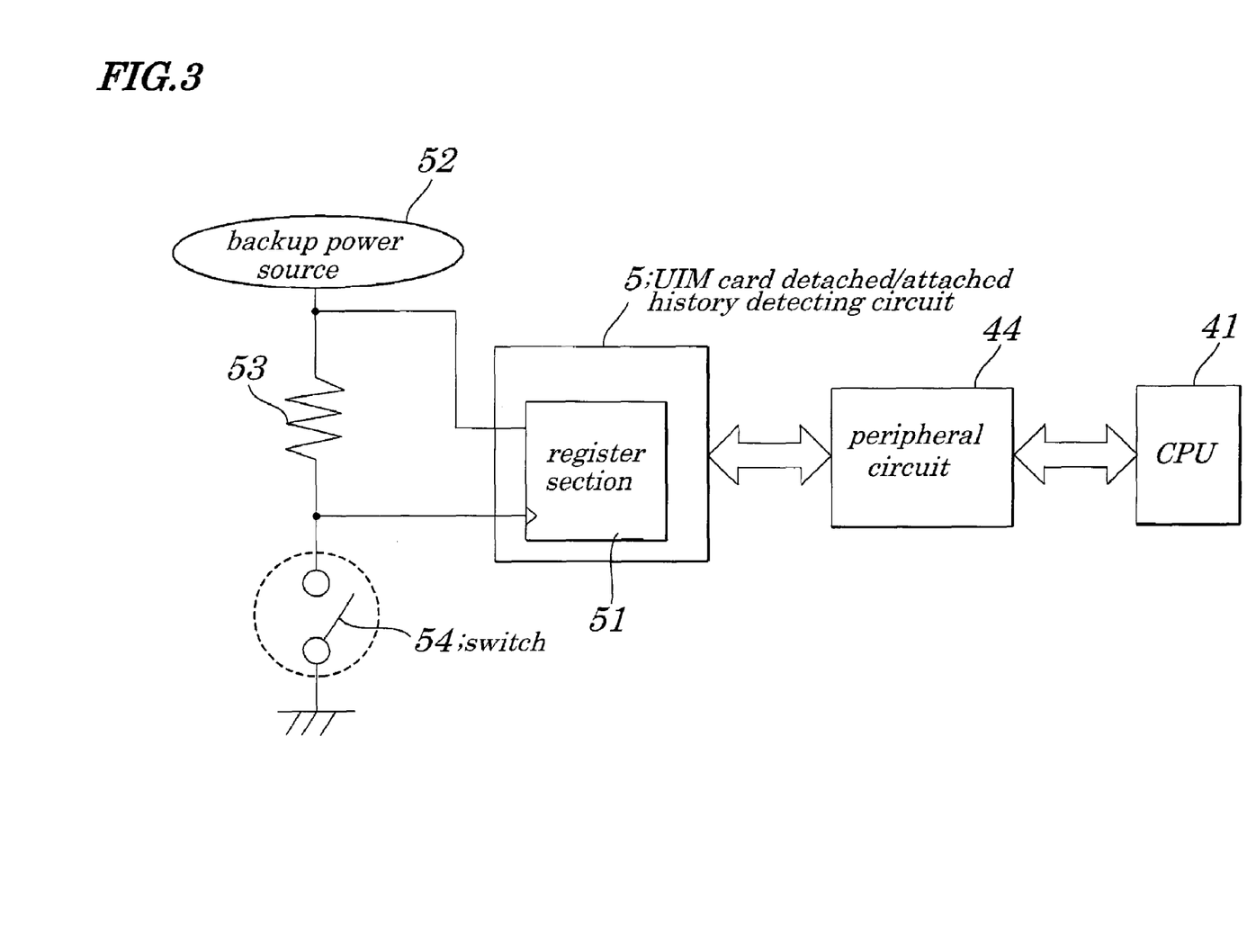
FIG. 3 is a schematic block diagram for showing a UIM card detached/attached history detecting circuit and its peripheral configurations according to the embodiment of the present invention.

FIG. 3 is a schematic block diagram for showing the UIM card detached/attached history detecting circuit 5 and its peripheral configurations. The UIM card detached/attached history detecting circuit 5 embeds a register section 51 which uses a secondary battery (backup power source 52) used only for storing data as a power source and, therefore, is able to hold data in an operation state and a register value while not mounting the battery pack 7. The register section 51 can read information through the peripheral circuit 44 from the CPU 41.

The CPU 41, when the portable cellular phone 1 is turned ON, reads a register value from the register section 51 and, when it is confirmed that the UIM card 8 has been detached and attached again, also reads user data such as a telephone number directory (record) or a like from the UIM card 8. The user data read by the CPU 41 from the UIM card 8 is stored in the RAM (43) shown in FIG. 1. When the portable cellular phone 1 is turned ON next time, the CPU 41, if having judged that the UIM card 8 has been detached and attached again based on a register value being stored in the register section 51, neither reads user data from the UIM card 8 nor expands user data into the RAM 43 and uses data being backed up by the RAM 43. Unlike in the case of the conventional configuration in which the judgement as to whether or not the UIM card 8 has been detached and attached again is made by detecting whether the battery pack 7 has been removed or not, the portable cellular phone 1 of the embodiment of the present invention enables a number of times when user data being stored in the UIM card 8 is read and the read user data is expanded in the RAM 43 to be reduced, thus enabling user waiting time required when the portable cellular phone 1 is turned ON to be reduced remarkably.

In order to detect whether or not the UIM card 8 has been detached and attached again, a resistor 53 and a switch (SW) 54 are connected to the backup power source 52 in series and a voltage at a connecting point between the resistor 53 and the switch 54 is input and store to the register section 51 as a register value. The register value in the register section 51 is reset according to an input signal (RST_REG) fed from the CPU 41. That is, if when it is confirmed that the UIM card 8 has been detached and attached again, the CPU 41 resets the register value in the register section 51, after user data in the UIM card 8 have been read and have been expanded in the RAM 43 following power-on. Also, the CPU 41 resets the register value in the register section 51, when the backup power source 52 has been fully discharged.

Figure 4:
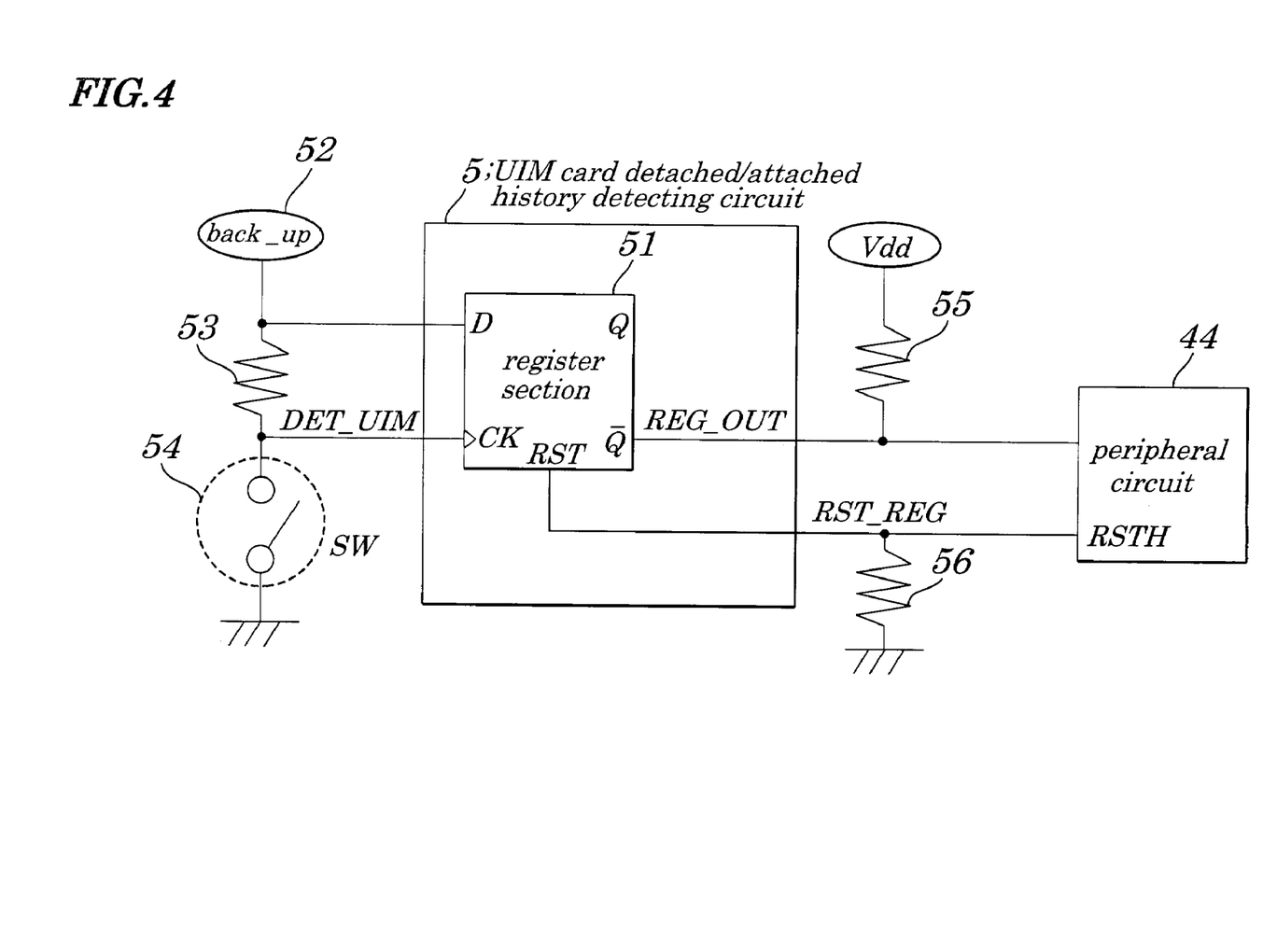
FIG. 4 is a diagram for showing in detail the UIM card detached/attached history detecting circuit and its peripheral configurations as shown in FIG. 3.

If a history record showing that the UIM card 8 has been detached is confirmed by the UIM detached/attached history detecting circuit 5 when a portable cellular phone 1 is turned ON, there is a risk that another UIM card 8 was inserted or that, even if a same UIM card 8 is used, internal user data was changed when the same UIM card 8 was used in an other portable cellular phone 1. Therefore, it is necessary to read all data including user data being stored in the UIM card 8 and expand (write) in the RAM 43. On the other hand, if no history record showing that the UIM card 8 has been detached is confirmed, since the user data in the UIM card 8 is not different from that being backed up, data is not read from the UIM card 8 and is not expanded in the RAM 43. FIG. 4 is a diagram for showing in detail the UIM card detached/attached history detecting circuit and its peripheral configurations as shown in FIG. 3. In FIG. 4, same reference numbers are assigned to components having same functions as those shown in FIG. 3. The UIM card detached/attached history detecting circuit 5 is mounted in the UIM card socket 6 or packaged in the peripheral circuit 44. The register circuit 51 included in the UIM card detached/attached history detecting circuit 5 operates using the backup power source 52 as a power source. An output terminal Q (with inverse bar) of the register section 51 is pulled up through a resistor 55 by a power source terminal Vdd and the output terminal Q (with inverse bar) is connected to an input terminal of the peripheral circuit 44. A reset terminal RST of the register section 51 is connected to a reset terminal RSTH of the peripheral circuit 44 by a line in which the input RST_REG signal is generated. Between the reset terminal RSTH and a ground is connected a resistor 56.

In the UIM card socket 6, since the switch 54 is closed when the UIM card 8 is inserted, a DET_UIM signal to be input to a CK (clock) terminal of the register section 51 goes low in level and an output signal REG_OUT output from the output terminal Q (with inverse bar) changes. Since the register section 51 is open-drained and is connected to the peripheral circuit 44, the output signal REG_OUT of the register section 51 is read by the CPU 41.

Figure 5:
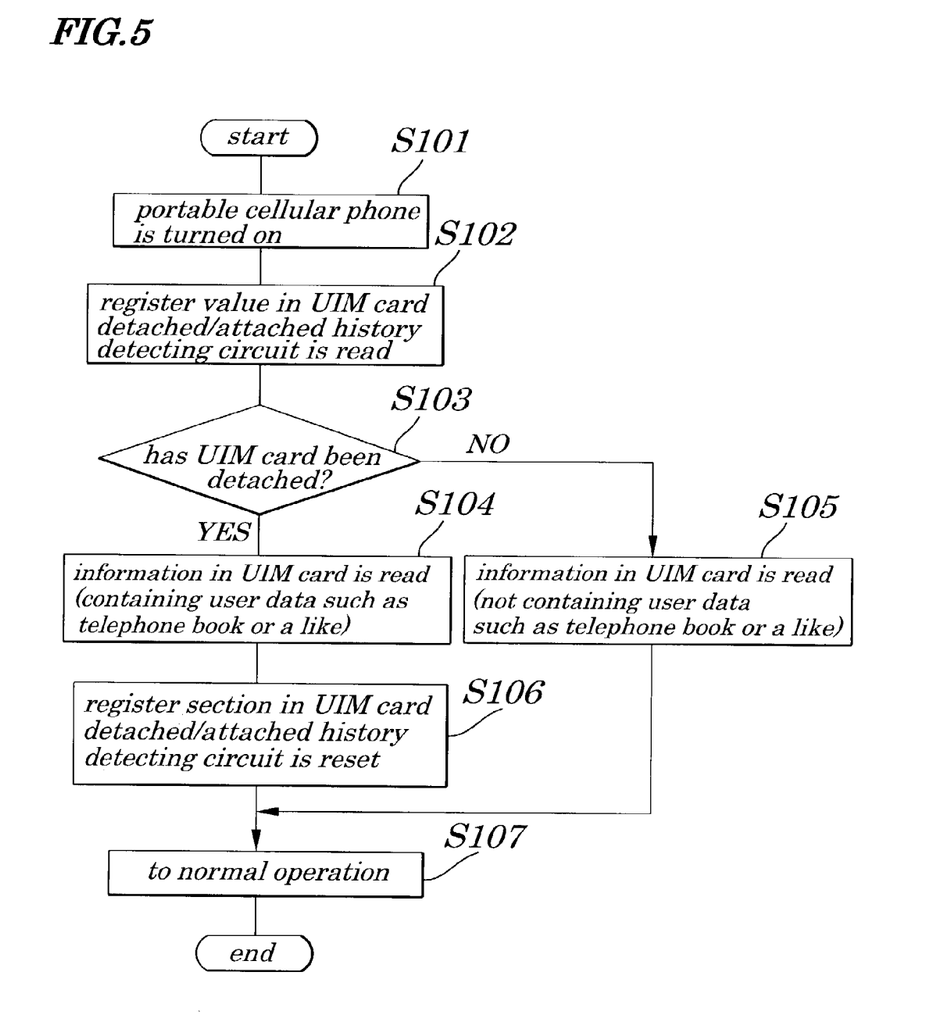
FIG. 5 is a flowchart showing processes of detecting a UIM card detached and attached history according to the embodiment of the present invention.

FIG. 5 is a flowchart showing processes of detecting a UIM card detached and attached history. Operations of the portable cellular phone 1 of the present invention are described by referring to FIG. 5. In this figure, a letter "S" represents a "step". First, when the portable cellular phone 1 is turned ON (S101), a register value set in the register section 51 in the UIM card detached/attached history detecting circuit 5 is read by the CPU 41 (S102). The CPU 41, based on the read register value, judges whether or not the UIM card 8 has been detached and attached again, that is, connected or not (S103). When it is confirmed that the portable cellular phone 1 has a history that the UIM card 8 has been detached and then the UIM card 8 or another UIM card 8 has been attached, information containing user data being stored in the UIM card 8 is read by the CPU 41 (S104). Moreover, it is judged that the portable cellular phone 1 has no history the UIM card 8 has been detached and then attached again, other information not containing user data being stored in the UIM card 8 is read by the CPU 41 (S105). After information containing user data has been read from the UIM card 8 in Step S104, the register section 51 is reset (S106). When processing in Step S106 or Step S105 is completed, a routine proceeds to a normal operation (S107).

Figure 6:
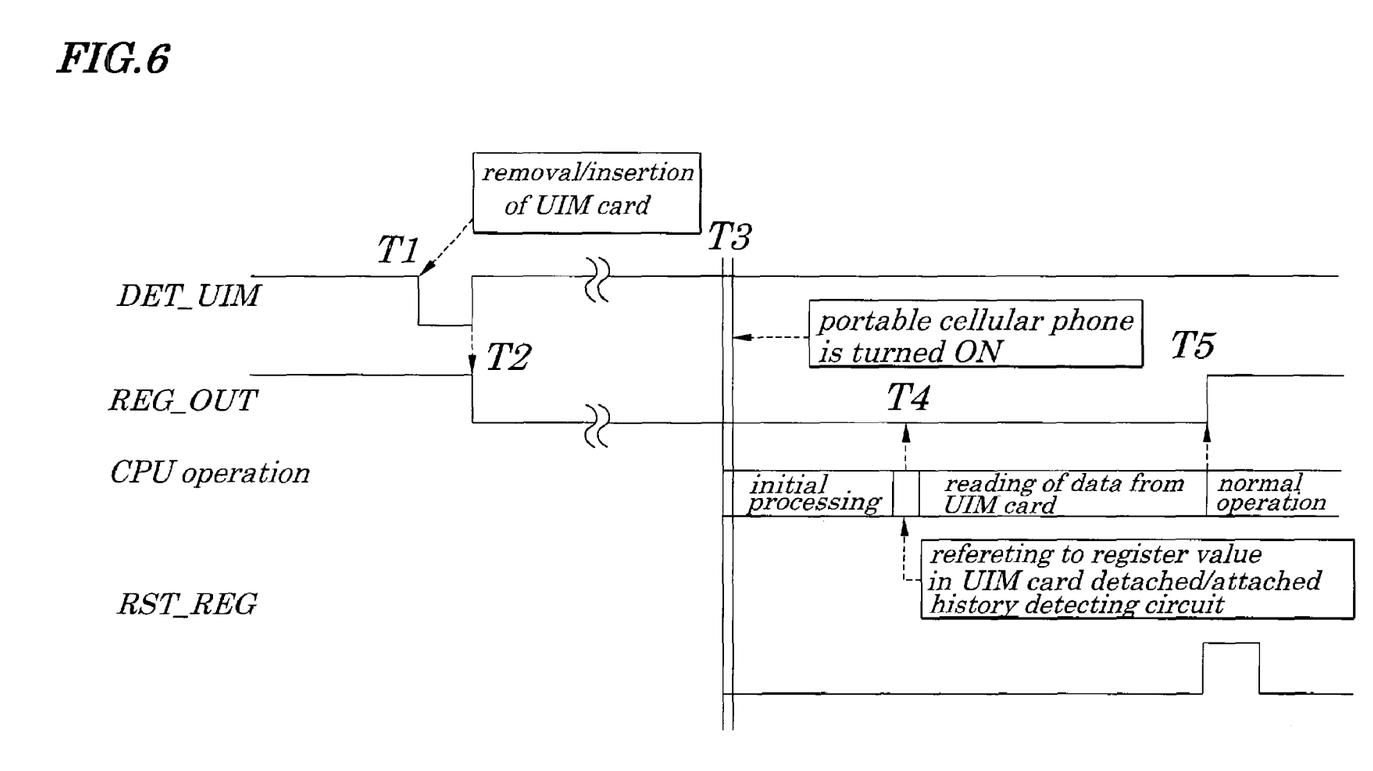
FIG. 6 is a diagram for illustrating operations of the UIM card detached/attached history detecting circuit performed when the UIM card is detached and then attached according to the embodiment of the present invention.

FIG. 6 is a diagram for illustrating operations of the UIM card detached/attached history detecting circuit 5 when the UIM card 8 is detached and then attached. When the UIM card 8 is inserted into the UIM card socket 6, the switch 54 is turned ON at a time T1 and a DET_UIM signal changes from a "H" (high) level to a "L" (low) level. Since the switch 54 receives power from the backup power source 52, even when the portable cellular phone 1 is OFF, the "DET_UIM" signal changes depending on whether or not the UIM card 8 has been detached and attached again. At time T2, the DET_UIM signal triggers a register value stored in the register section 51 to be set at an "L" level. Thereafter, when the portable cellular phone 1 is turned ON at time T3, the CPU 41, after having completed its initial processing, detects a register value "L" of the register section 51 in the UIM card detached/attached history detecting circuit 5 at time T4. The CPU 41, based on a state where the register value is "L" (low) level, reads information containing user data from the UIM card 8 and expands it in the RAM 43 and, at time of completion of the processing, resets the register section 51 (at time T5) and then has a routine proceed to a normal operation.

As described above, according to the portable cellular phone 1 of the present invention, when power is turned ON, history data on whether the UIM card 8 has been detached and then attached again is detected and, according to a result from the detecting, whether or not user data such as a telephone number directory or a like is made to be contained in information to be read is judged and processing of reading the user data from the UIM card 8 is performed. However, only when history data showing that the UIM card 8 has been detached and then attached again is confirmed, information containing user data such as a telephone number directory (record) or a like being stored in the UIM card 8 is read. Therefore, so long as the UIM card 8 is being inserted, even if an ON/OFF operation of the power is performed any number of times, since processing of reading user data is not performed. As a result, when the user makes reference to the telephone number directory or only replaces a battery, since access to the UIM card 8 is not required, waiting time is not necessary and better usability of the portable cellular phone 1 can be achieved.

It is apparent that the present invention is not limited to the above embodiments but may be changed and modified without departing from the scope and spirit of the invention. For example, in the above embodiment, a case where the portable cellular phone is used is explained. However, the present invention may be applied to an electronic device which has a radiophone function and which can mount a UIM card, for example, to a PDA (Personal Digital Assistant) having a radiophone function and being configured so as to be capable of mounting the UIM card.

What is claimed is:

1. A portable cellular phone on which a user identity module (UIM) card having user-entered information data and other data is able to be attached and detached, and having a battery pack power that can be turned ON, comprising:
   a detecting unit, arranged to electrically detect whether or not a UIM card detach/re-attach event occurs, said UIM card detach/re-attach event being a UIM card being detached followed by a UIM card being attached, and to retrievably store a detecting content having a history data indicating the detecting of the UIM detach/re-attach event; and
   a controlling unit, having a controller memory, the controlling unit arranged to read the detecting content stored in said detecting unit in response to the battery pack power being turned ON and, only when said detecting content includes the history data showing that said UIM card detach/re-attach event has occurred, to read the user-entered information data from the UIM card and store said user-entered information data in said controller memory.

2. The portable cellular phone according to claim 1, wherein said user information-entered data comprises a telephone number directory.

3. The portable cellular phone according to claim 1, further comprising a backup power source connected to said detecting unit, wherein said detecting unit includes a switch whose output state changes when said UIM card detach/re-attach event occurs, wherein said history data is based on said output state change, and wherein the detecting unit further comprises a register unit arranged to store said history data.

4. The portable cellular phone according to claim 3, further comprising a UIM card socket arranged to selectively attach to and detach from a UIM card, and wherein said switch is arranged with respect to said UIM card socket to operate in synchronization with operations of detaching and attaching said UIM card from and to, respectively, said UIM card socket.

5. The portable cellular phone according to claim 1, wherein said controlling unit is arranged to read said detecting content in response to the battery pack power ON and in response to said history data not having said detection record, to read said other information data not containing said user-entered information data from said UIM card without reading said user-entered information data.

6. The portable cellular phone according to claim 3, wherein said controlling unit has a central processing unit (CPU), the CPU arranged to read a value stored in said register unit corresponding to said change of said output state and representing said history data, and arranged to judge, based on said value, whether or not said history data is stored indicating UIM card detach/re-attach event has occurred and, when having judged that there is no said history data, reads from said UIM card said other information not containing said user-entered information data.

7. The portable cellular phone according to claim 3, wherein said controlling unit has a central processing unit (CPU) arranged to read a value stored in said register unit corresponding to said change of said output state and representing said history data, and arranged to judge, based on said value, whether or not said history data is stored indicating UIM card detach/re-attach event has occurred and, when having judged that said history data shows that UIM card detach/re-attach event has occurred, to read from said UIM card said user-entered information data.

8. A portable cellular phone on which a user identity module (UIM) card having user-entered information data and other data not having the user-entered information data is able to be attached and detached, comprising:
   a detecting means for detecting whether or not a UIM card detach/re-attach event occurs, said UIM card detach/re-attach event being a UIM card being detached and then a UIM card attached again, and to retrievably store a detection record in a history data indicating the detecting of the UIM card detach/re-attach event; and
   a controlling means for reading the history data stored by said detecting means in response to the battery pack-power being turned ON and, only when said history data includes said detection record that said UIM card detach/re-attach event has occurred, to read the user information data from said UIM card.

9. A portable cellular phone according to claim 8, wherein said user data comprises a telephone number directory.

10. The portable cellular phone according to claim 8, wherein said detecting means is connected to a backup power source and is provided with a switch means having an output state that changes when said UIM card detach/re-attach event occurs and with a register means to store the output state of said switch means as said detection record data.

11. The portable cellular phone according to claim 10, wherein said switch means operates to said output state in synchronization with operations of detaching and attaching said UIM card in or out of a UIM card socket from which said UIM card is detachable and attachable.

12. The portable cellular phone according to claim 8, wherein said controlling means, in response to said reading indicating that there is no said history data showing that said UIM card has been detached and then a UIM card has been attached again, reads from said UIM card said other information not containing said user data.

13. The portable cellular phone according to claim 10, wherein said controlling means has a central processing means (CPU) for reading a value stored in said register means corresponding to said change of said output state and representing and, based on said value, judges whether or not said history data shows a UIM card has been detached and then a UIM card has been attached again and, when having judged that there is no said history data showing that said UIM card has been detached and then said UIM card or another UIM card has been attached again, reads from the UIM card information not containing said user data, without reading from the UIM card said user-entered information data.

14. The portable cellular phone according to claim 10, wherein said controlling means has a central processing means (CPU) for reading a value stores in said register means corresponding to said change of said output state and representing and, based on said value, judges whether or not a UIM card has been detached and then a UIM card or another UIM card has been attached again and, when having judged that a UIM card has been detached and then a UIM card has been attached again, reads information containing said user-entered information data.

* * * * *